United States Patent [19]
Joyce

[11] 3,801,893
[45] *Apr. 2, 1974

[54] PULSE GENERATOR USING BI-LATERAL SOLID STATE BREAKOVER DEVICE ENERGIZED BY AN AC SIGNAL

[75] Inventor: Michael F. Joyce, Chicago, Ill.

[73] Assignee: North American Philips Corporation, New York, N.Y.

[ * ] Notice: The portion of the term of this patent subsequent to Oct. 2, 1990, has been disclaimed.

[22] Filed: Feb. 19, 1970

[21] Appl. No.: 12,754

[52] U.S. Cl.............. 321/43, 307/108, 307/261, 307/318, 307/324, 310/8.1, 321/10, 323/22 Z, 318/116, 332/9
[51] Int. Cl. .......................................... H02m 7/20
[58] Field of Search ............... 321/43, 46, 47, 10; 310/8.1; 318/116; 307/106, 108, 261, 268, 287, 318, 324; 328/28, 57, 65; 332/9; 323/22 Z

[56] References Cited
UNITED STATES PATENTS

| | | | |
|---|---|---|---|
| 3,188,487 | 6/1965 | Hutson | 307/261 X |
| 3,206,618 | 9/1965 | Kallman | 307/287 |
| 3,056,046 | 9/1962 | Morgan | 307/106 X |
| 3,166,276 | 1/1965 | Goerner et al. | 307/318 X |
| 3,196,329 | 7/1965 | Cook et al. | 307/287 X |
| 3,310,725 | 3/1967 | Scarr et al. | 321/2 |
| 3,447,151 | 5/1969 | Potter | 307/324 X |
| 3,467,876 | 9/1969 | Tatsuzawa et al. | 328/57 X |

Primary Examiner—Gerald Goldberg
Attorney, Agent, or Firm—Frank R. Trifari

[57] ABSTRACT

A pulse generator operated directly from an alternating voltage source and including, in series, a bi-lateral negative resistance element, an inductance, and a capacitor. The increasing alternating voltage builds up across the bi-lateral element until the latter reaches its breakover point and transfers a charge to the capacitor. The bi-lateral element then becomes non-conductive again, and voltage again starts to build up across it. This cycle of operation continues as long as the alternating voltage builds up and then reverses as the alternating voltage starts to decrease. The inductance can be a transformer primary winding, and the secondary can actuate a relay contact section or be connected to a rectifier to generate a direct voltage with a much higher ripple frequency than the voltage applied to the series circuit. The generator may also be used to produce an audio or ultrasonic tone by connecting the voice coil of a loudspeaker or an ultrasonic generator as the inductance coil.

4 Claims, 7 Drawing Figures

PATENTED APR 2 1974 3,801,893
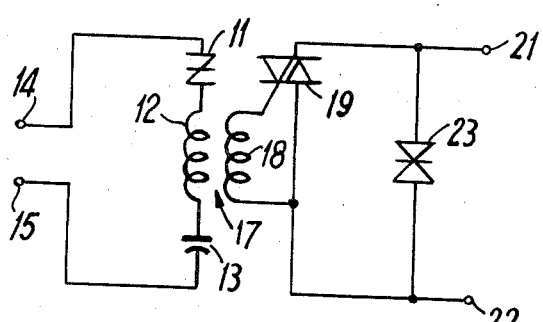
FIG. 1
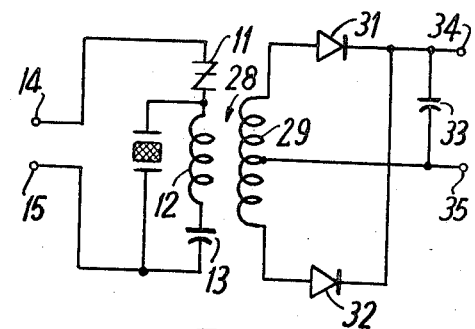
FIG. 4
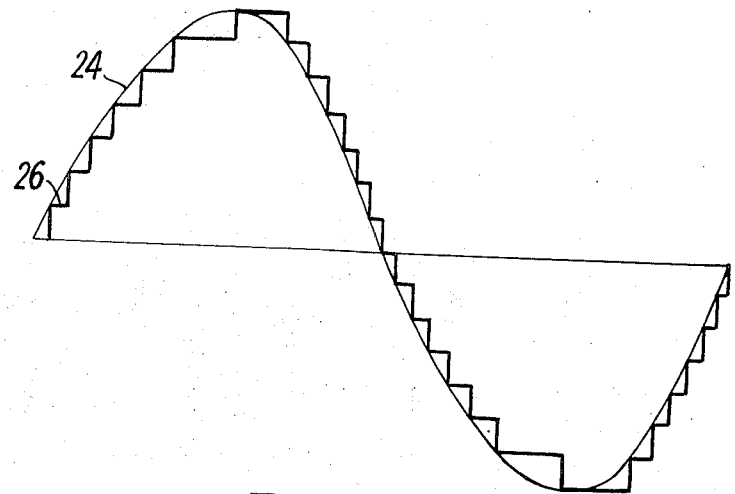
FIG. 2
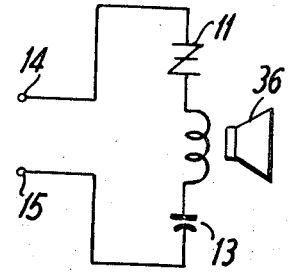
FIG. 5
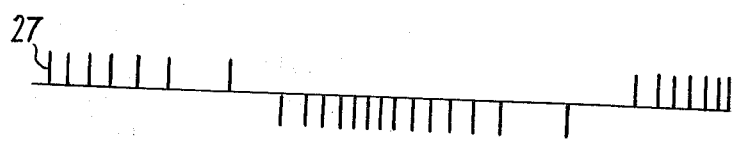
FIG. 3
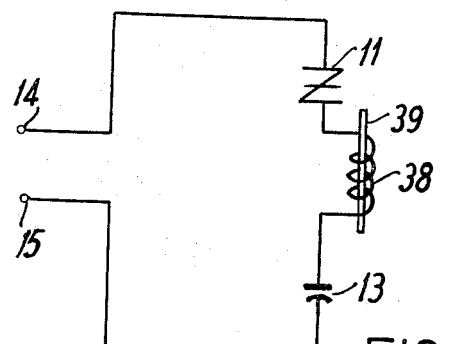
FIG. 7
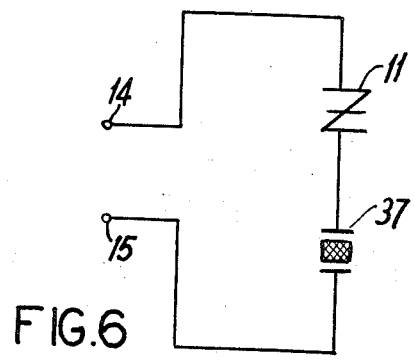
FIG. 6
INVENTOR.
MICHAEL F. JOYCE
BY
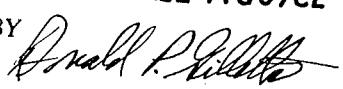
ATTORNEY 3,801,893

PULSE GENERATOR USING BI-LATERAL SOLID STATE BREAKOVER DEVICE ENERGIZED BY AN AC SIGNAL

FIELD OF THE INVENTION

This invention relates to pulse generators driven directly from alternating voltage sources without rectification and particularly to pulse sources capable of driving solid state relay contact-equivalent circuits, power supply rectification circuits, loudspeakers, and other load elements.

BACKGROUND OF THE INVENTION

Usually pulse generators are operated from direct current power supplies to generate pulses at a relatively constant frequency, either inherently or as a result of being synchronized by an alternating voltage, such as a square wave or other type of voltage having synchronizing characteristics. If exact frequency control of the pulse wave is of paramount importance, these modes of operation are not only acceptable but almost mandatory.

However there exists a need for a source of pulse voltage waves in which frequency is not so important but the mere fact of the production of a pulse waveform is both important and useful. For example, in solid state relays of the type disclosed and claimed in my copending application Ser. No. 32,794, filed on Apr. 29, 1970 and entitled SOLID STATE RELAY, the contact section of the relay is actuated by a source of pulses controlled by the part of the relay that is equivalent to the coil of the normal electromagnetic relay. In such solid state relays the repetition rate of the pulses generated is not critical, except that it must be above a certain figure determined by the frequency of the current that is to be controlled by the contact section.

In still another category of usage it is desirable to have a high frequency voltage source for rectification to produce a direct current that can be easily filtered to remove ripples. In the use of a direct current power supply operated from a 60 cycle line the repetition rate of impulses is either 60 cycles per second for half-wave rectification or 120 cycles for full-wave rectification. In either case if it is desired to smooth out the resultant impulses, a filter must be provided that is capable of handling the necessary current and transmitting only the direct current portion substantially free of ripple variation. This requires relatively large capacitors and sometimes relatively large chokes. Radio frequency power supplies and pulse-operated power supplies such as are used in generating the anode voltage for television receivers have been known heretofore, but in each case they were operated from a 60 cycle source that was first transformed into a direct voltage before being used to operate a high frequency generator.

Other uses for a pulse signal that need not have a precisely controlled frequency are as a source of an audible tone for a buzzer or an annunciator system and as an ultrasonic signal source.

BRIEF DESCRIPTION OF THE INVENTION

In the present invention a solid state element is used that has a bi-lateral negative resistance characteristic, that is, a characteristic such that the impedance across two of the terminals of the device is positive up to a certain voltage level, identified as the breakover voltage point, and then is sharply negative. The device is termed bilateral because its characteristic is substantially symmetrical about the zero voltage point, and it does not matter whether the voltage excursion is positive or negative; a sufficiently large excursion will reach either the positive or negative breakover voltage.

BRIEF DESCRIPTION OF THE DRAWINGS

FIG. 1 is a schematic diagram of a solid state relay incorporating a pulse generator according to the invention;

FIG. 2 is a waveform of operating voltages of the pulse generator part of the circuit in FIG. 1;

FIG. 3 is a waveform of pulses generated in the circuit in FIG. 1;

FIG. 4 is a schematic diagram of a power supply incorporating a pulse generator according to the invention;

FIG. 5 is a schematic diagram of a circuit for generating an audible tone in accordance with the invention;

FIG. 6 is a schematic diagram of a piezo-electric ultrasonic generator incorporating the invention; and FIG. 7 is a schematic diagram of a magnetostrictive ultrasonic generator incorporating the invention.

DETAILED DESCRIPTION OF THE INVENTION

The circuit in FIG. 1 includes a pulse generator section comprising a solid state device 11 having a symmetrical breakover characteristic. This is connected as a two-terminal device which has a positive impedance for small voltages, either positive or negative, but a negative impedance for larger voltages that exceed a magnitude known as the breakover voltage. Because the operating characteristics are symmetrical about the zero voltage point, the device 11 may also be referred to as a bi-lateral solid state breakover device.

The device 11 is connected in series with an inductance 12 and a capacitor 13 between two input terminals 14 and 15. The inductance 12 may be the primary of a transformer 17 which has a secondary winding 18 connected directly across the gate and cathode input electrodes of a triac 19. Instead of a single triac, other suitable solid state devices may be used, such as SCR's, transistors, and the like, as described in the various secondary, or contact-equivalent circuits, as incorporated in my aforesaid application. Furthermore, the secondary 18 may be center-tapped, or more than one secondary may be provided in accordance with the circuits described in my aforesaid application. The output electrodes of the triac 19 are connected directly across output terminals 21 and 22, and a voltage-limiting breakdown device 23 to protect against excessively high voltages across the triac.

The operation of the circuit in FIG. 1 will be described in relation to the voltage waveforms in FIGS. 2 and 3. The sinusoidal waveform 24 represents the voltage applied across the terminals 14 and 15, typically 115 volts. As this voltage starts upward from the zero level, the voltage builds up across the device 11 until the breakover point is reached. At that point, the impedance drops sharply and a charge is applied across the capacitor 13 by means of a current that must flow through the coil 12. The duration of the pulse is related to the capacitance, which determines the quantum of charge. The voltage across the capacitor builds up stepwise according to the waveform 26, and the pulses across the coil 12 are indicated by waveform 27 in FIG. 3.

Since the breakover voltage has a constant value, the vertical portion of each step in the waveform 26 is the same, as is the amplitude of each of the pulses 27; but the spacing between successive steps and pulses, which may be thought of as the repetition rate, reduces as the rate of change of the waveform 24 reduces toward its peak value.

When the voltage waveform 24 passes its peak and starts down, the bi-lateral characteristic of the device 11 operates in the reverse direction and the voltage across the capacitor 13 steps down. Since, in this case, charge is being transferred out of the capacitor, or in a negative direction, the pulses 27 will also be negative until the waveform 24 reaches its negative peak.

The pulses 27, either positive or negative, actuate the triac 19 to turn it on and, in effect, place a very low impedance across the terminals 21 and 22. The terminals 21 and 22 are thus equivalent to the normally-open terminals of a relay actuated by the voltage applied to the input terminals 14 and 15. As long as there is an actuating voltage, the terminals 21 and 22 are essentially closed, i.e., short-circuited.

The circuit in FIG. 4 comprises the same pulse generator section as the circuit in FIG. 1 and has, in addition, a transformer 28 with a center-tapped secondary 29 connected to a full-wave rectifier circuit comprising two diodes 31 and 32 and a simple smoothing circuit comprising a capacitor 33 with a relatively low capacitance, at least low as compared to the usual 60 cycle supply that might be used for the same end purpose. The capacitor 33 produces relatively smooth direct voltage between the output terminals 34 and 35.

The rectification section of the circuit in FIG. 4 rectifies the pulses 27 of FIG. 3 to produce a direct voltage. For many purposes a low output voltage of 7 to 10 volts is desired and the step-up ratio of the primary winding 12 to the secondary winding 29 need not be large. The amount of energy transferred across the transformer 28 is dependent on the capacitance of the capacitor 13 and the pulse repetition rate, which is a function of the breakover voltage level of the device 11, and the initial supply frequency. For power supply purposes the capacitance is preferably larger than for the relay shown in FIG. 1.

FIG. 5 shows a simple audio tone generator such as may be used in a paging system or a warning system or wherever an audible tone signal may be desired. In this circuit the voice coil of a loudspeaker 36 is connected in series with the device 11 and the capacitor 13 to render audible the current pulses transmitted through the series circuit.

The pulse generator of the present invention may also be used to actuate a piezo-electric ultrasonic source as shown in FIG. 6. In this circuit the same bi-lateral solid state break-over device 11 is connected in series with the input terminals 14 and 15, but a piezo-electric ultrasonic device 37 takes the place of the capacitor 13 of FIG. 1. The inherent capacitance of such a piezo-electric device is normally quite low, and by applying an alternating voltage of sufficient amplitude and frequency to the input terminals 14 and 15, a series of pulses of ultrasonic frequency may be generated across the piezo-electric device 37. The alternator can then be used for ultrasonic mixing or as an ultrasonic cleaner or for many other purposes where the exact ultrasonic frequency is not important.

An alternative ultrasonic source is shown in FIG. 7 in which a coil 38 is connected in series with the bi-lateral breakover device 11, the capacitor 13, and the input terminals 14 and 15. This coil energizes a magnetostrictive rod 39 in response to the current pulses that pass through the coil 38, and by choosing a set of parameters, the energizing frequency may extend into the ultrasonic range.

What is claimed is:

1. A pulse generator comprising:
   A. a pair of terminals to receive an alternating voltage; and
   B. a series circuit connected across said terminals and comprising:
      1. a bi-lateral solid state breakover device having a breakover voltage substantially lower than the amplitude of said alternating voltage,
      2. a capacitor, and
      3. an inductance coil to carry pulses of current in transferring increments of charge to said capacitor, said pulses of current being at a frequency substantially higher than the frequency of said alternating voltage.

2. The pulse generator of claim 1 comprising, in addition:
   a magnetostrictive rod coupled to said inductance coil to be magnetostrictive energized thereby.

3. A solid state relay comprising the pulse generator of claim 1 and, in addition:
   A. a secondary winding coupled to said inductance coil;
   B. a second solid state device comprising:
      1. input electrodes connected to said secondary winding to be energized thereby, and
      2. output electrodes to carry relatively large current as long as pulses from said inductance coil are transmitted to said input electrodes.

4. A power supply comprising the pulse generator of claim 1 and, in addition:
   A. a secondary winding coupled to said inductance coil;
   B. a rectifier circuit connected to said secondary winding; and
   C. a smoothing capacitor connected to said rectifier circuit to produce relatively ripple-free direct voltage.

* * * * *